United States Patent [19]
Bambozzi

[11] Patent Number: 5,081,335
[45] Date of Patent: Jan. 14, 1992

[54] MINIATURE WELDING APPARATUS

[75] Inventor: Bruno Bambozzi, San Paulo, Brazil

[73] Assignee: Bambozzi S/A. -Máquinas Hidráulicas E Elétricas, San Paulo, Brazil

[21] Appl. No.: 598,395

[22] Filed: Oct. 16, 1990

[30] Foreign Application Priority Data

Oct. 17, 1989 [BR] Brazil ............................. 8905260

[51] Int. Cl.⁵ ................................................ B23K 9/10
[52] U.S. Cl. .................................. 219/130.1; 336/198
[58] Field of Search ................... 219/130.1, 137 PS; 336/198

[56] References Cited

U.S. PATENT DOCUMENTS

| | | | |
|---|---|---|---|
| 2,086,316 | 7/1937 | Holslag | 219/130.1 |
| 2,322,709 | 6/1943 | Owen | 219/130.1 |
| 2,387,327 | 10/1945 | Holslag | 219/130.1 |
| 3,750,073 | 7/1973 | Okano | 336/198 |
| 4,000,483 | 12/1976 | Cook et al. | 336/198 |

Primary Examiner—Clifford C. Shaw
Attorney, Agent, or Firm—Thomas N. Ljungman

[57] ABSTRACT

The invention deals with a new miniaturized welding machine, suitable for light soldering jobs.

In general lines, the invention consists of the construction of a machine for electric welding with characteristics of a source of constant current. For this purpose, in the central leg of the core (15), a bundle of steel blades in a shape similar to that of the letter "E" (16) faced by the letter "I" (17), a primary coil (18) and a secondary coil (19), are placed on the opposite ends of the central leg of the core, remaining between them the space occupied by a physical separator (20) of both coils; what happens is that, when to the secondary coil is connected a charge resistance (21), it is produced the characteristics of a constant current source, suitable to determine the fusion of electrodes allowing the performance of the desired welding.

20 Claims, 9 Drawing Sheets

MINIATURE WELDING APPARATUS

BACKGROUND OF THE INVENTION

Field of the Invention

The present invention deals with the industrial model of a new and original configuration used for a miniaturized source for electric welding; due to its exterior lines, modern and harmonious, the new model appears as a "sui generis" whole, which makes possible its immediate distinction when placed in comparison with any of the similar machines known up to the present. Additionally, the present invention deals with the invention and the industrial model of a new and original configuration taking place in a miniaturized source, for electric welding.

OBJECT OF THE INVENTION

The purpose of the present invention is to offer a new type of welding machine, of excellent quality and low price, and which is suitable for general welding jobs of small requirements from the machine, particularly for amateurs.

SUMMARY OF THE INVENTION

In general, the invention consists of the construction of a machine for electric welding with the characteristics of a source of constant current. For this purpose, in the central leg of the core of the bundle of steel blades shaped like the letter "E", facing the letter "I", are placed one primary coil and a secondary coil, in the opposite ends of the central leg of the core, remaining between them spaces occupied by a physical separator of both coils which means that, if the secondary coil is connected to a resistance, we achieve the characteristics of a source of constant current appropriate for the electrode fusion allowing the desired welding.

BRIEF DESCRIPTION OF THE DRAWINGS

To better understand the invention, the following drawings have been provided, wherein.

DESCRIPTION OF THE PREFERRED EMBODIMENTS

Figure 1:
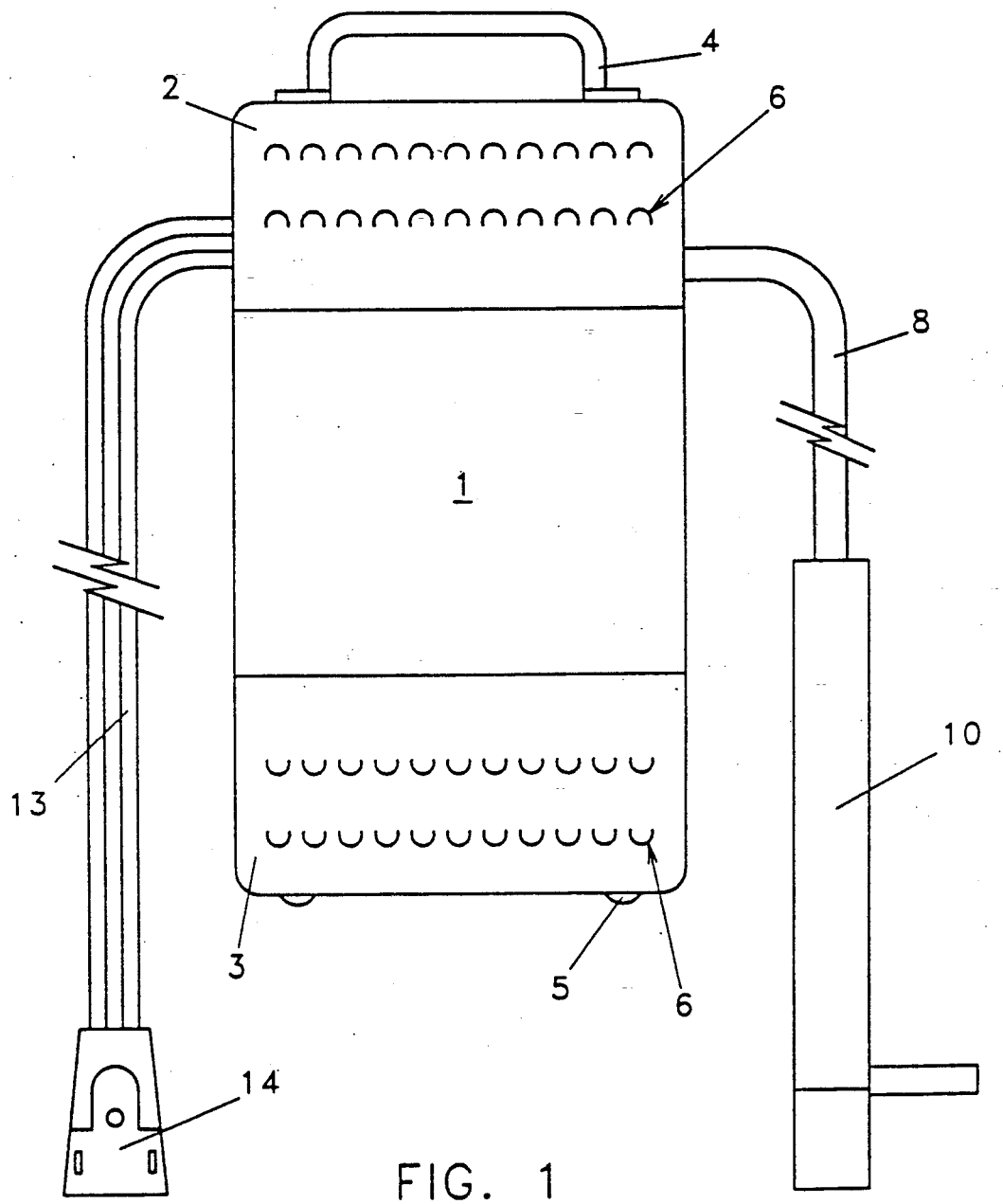
FIG. 1 shows a front view of the new model of the miniaturized source, with its main measurements.

In accordance with the accompanying illustrations and their details, a new miniaturized source for electric welding is presented, built with a main body shaped as a parallelopiped (1), a magnetic core, and higher (2) and lower (3) protection for the magnetic core. The higher and lower protection (2,3) are shaped as capsules and are hereinafter referred to as capsulized protection covers. The higher, or upper protection cover (2) is centrally equipped with a handle (4) and the lower protection cover (3) is equipped with support saliences (5), while the sides of those capsules present a series of semi-holes (6) for ventilation, disposed in accordance with horizontal lines. From one of the vertical sides and going through the openings (7) placed close to the edges of the capsule (2) there are the conductors (8) and (9) which have, at their ends, respectively, an electrode support (10) and a connecting hook (11) whereas, on the opposite side, throughout the opening (12) passes the conductor (13) with a tripolar plug (14) on its end.

Figure 2:
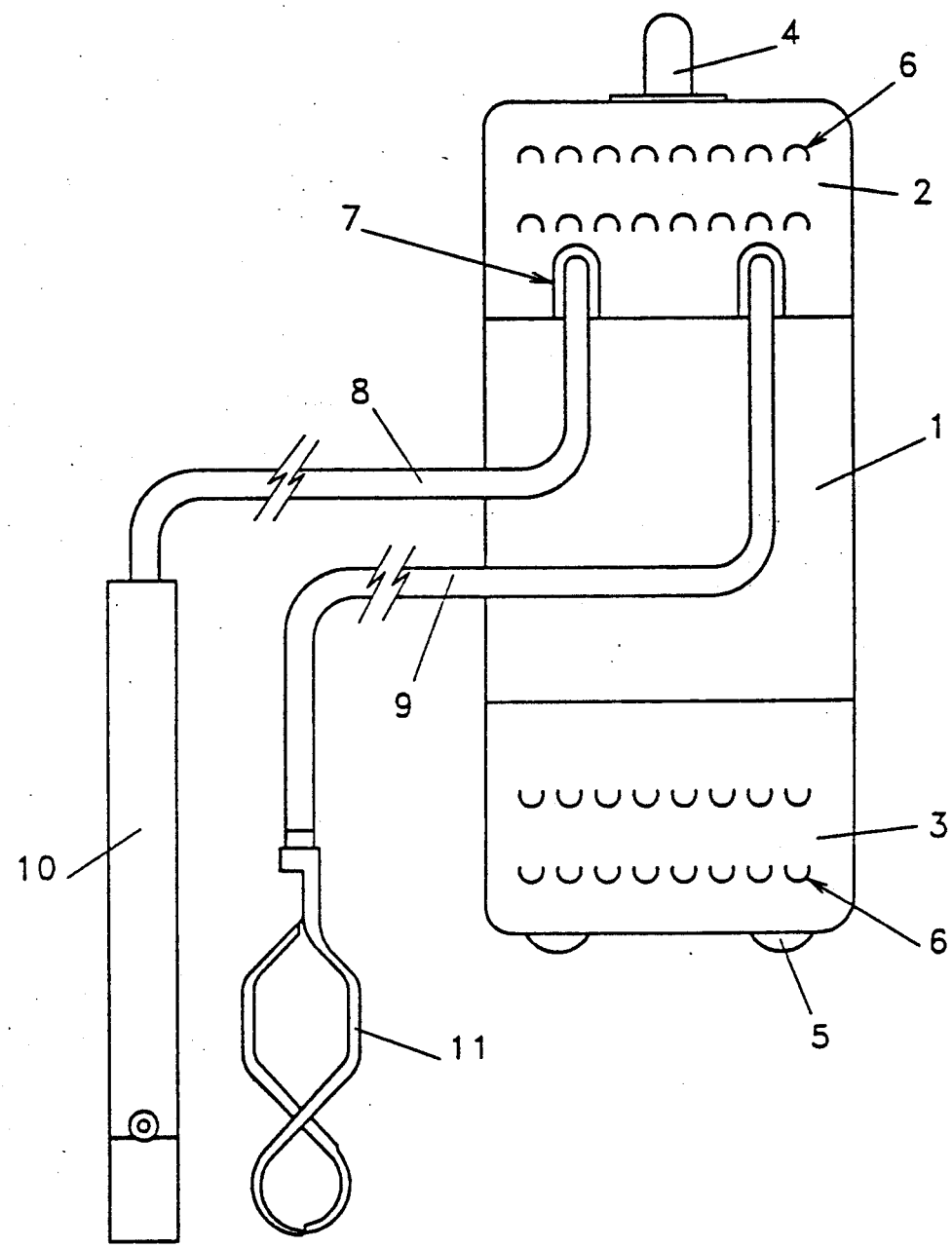
FIGS. 2 and 3 show the side views of the machine, FIGS. 4 and 5 correspond to the views of the top and bottom, respectively.
Figure 3:
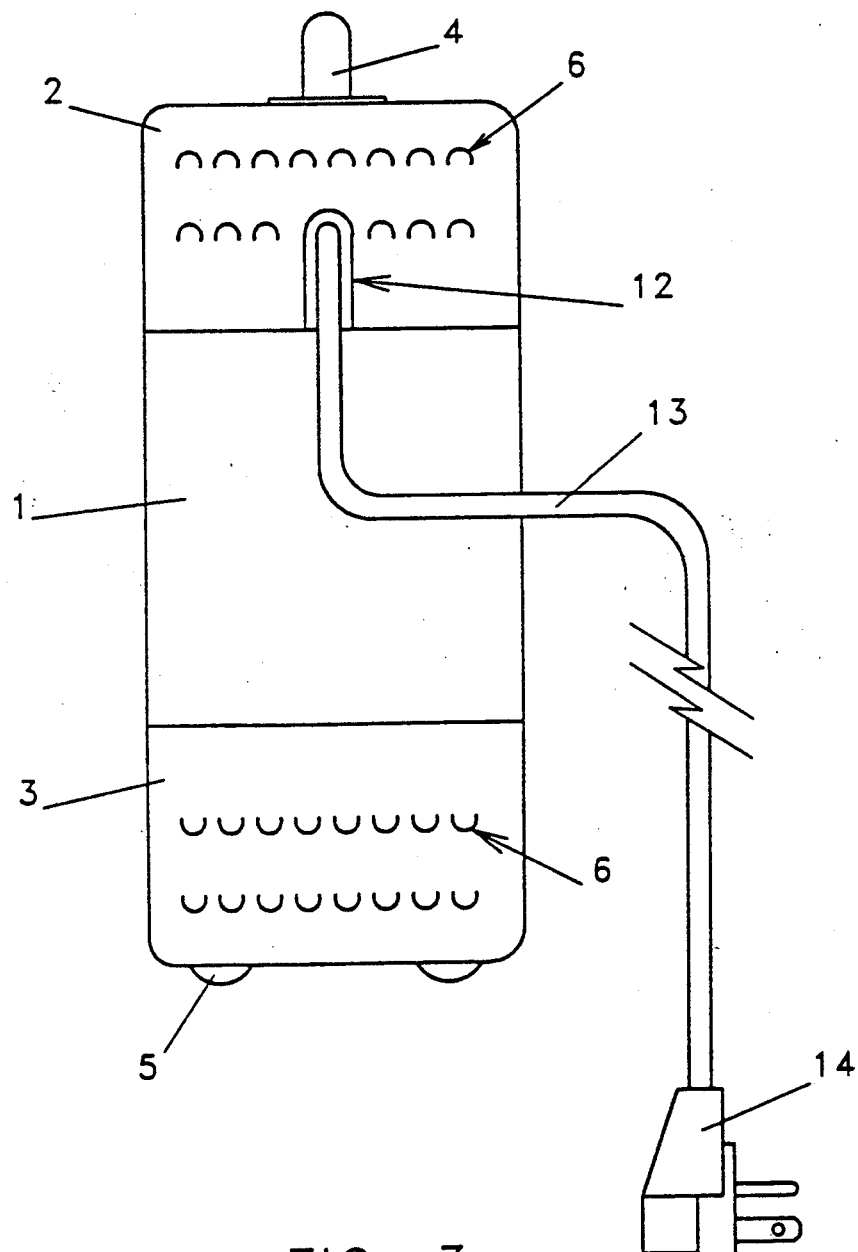
Figure 4:
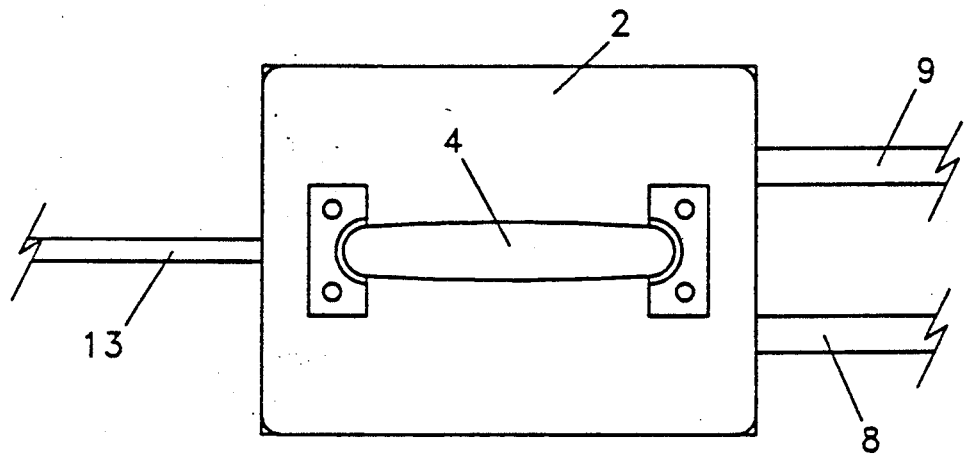
Figure 5:
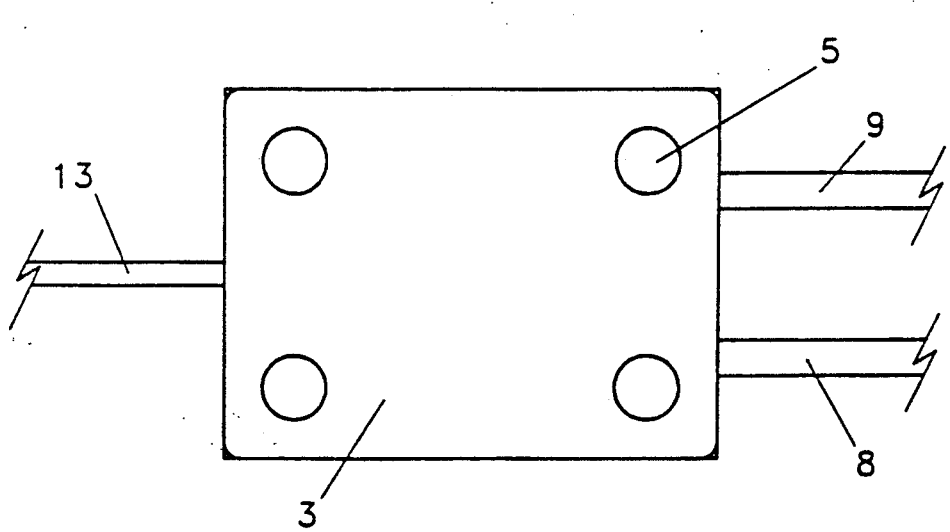
Figure 6:
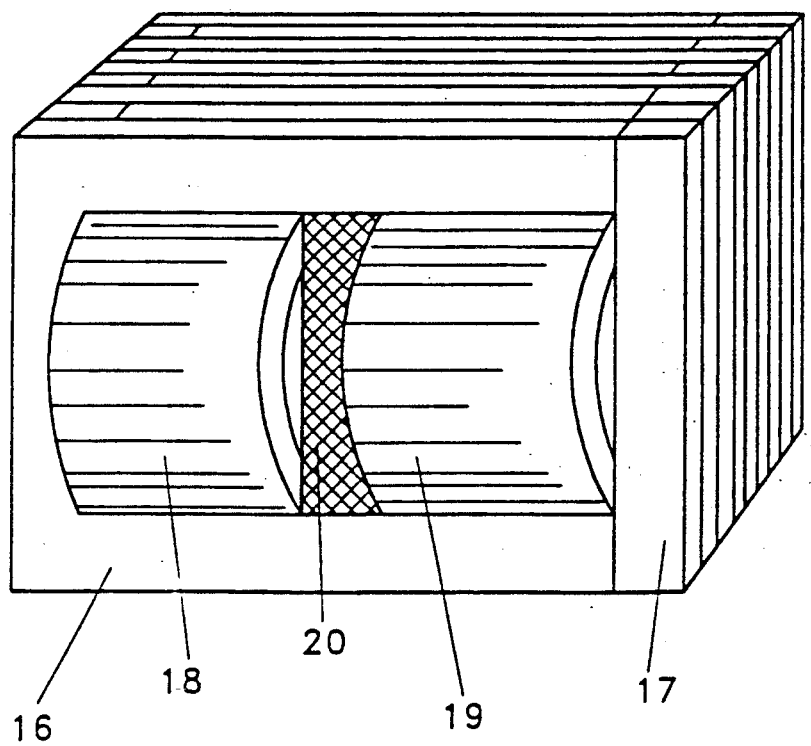
FIG. 6 shows a view of the main body of the new machine, detailing its core of steel blades with a double coil in its central leg.

The size of the welding machine may be considered to be between two and six times the scale used in FIGS. 1 through 5. For example, a vertical dimension of the apparatus may be between 9 and 27 inches, a horizontal dimension, as shown in FIG. 1, may be between 5 and 15 inches, and another horizontal dimension, corresponding to the width of the sides of the apparatus, as shown in FIGS. 2 and 3, may be between 4 and 12 inches.

The capsulized protection covers (2) and (3), respectively, are preferably constructed of a strong, thin material such as sheet metal. However, the covers (2,3) may also consist of thicker material, depending on the maximum allowable weight desired for the apparatus.

The semi-holes, or openings (7) disposed throughout the protection covers (2,3) are preferably semicircular orifices evenly distributed along horizontal lines over the surface of the protection covers. As an example, each of the front and back sides of each of the protection covers (2,3), as may be seen in FIG. 1, may include two horizontal rows of eleven semicircular holes each, while each side of each protection cover, as seen in FIGS. 2 and 3, may include two rows of eight semicircular holes each. The diameter of each hole as such may be between $\frac{1}{2}$" and $1\frac{1}{2}$". The openings (7) are preferably configured to allow the best possible ventilation and air circulation into and out of the welding machine. More particularly, the provision of openings on each of the four sides of each of the protection covers substantially allows for continuous, unimpeded ventilation; any fresh air entering through any one of the sides of any of the protection covers is free to exit through the opposite side.

The embodiment shown in FIGS. 1 through 3 additionally shows that the curved part of each semicircle is oriented upwardly on the upper protection cover (2) and downwardly on the lower protection cover (3). Consequently, in the embodiment shown in FIGS. 1 through 3, the configuration of the semicircular holes may serve a decorative, as well as a functional purpose.

As an alternative, the openings (7) may consist of a larger number of smaller perforations. Additionally, another embodiment of the invention may include the provision of elongated vertical slots for the openings (7). These embodiments may also provide the same advantages for air circulation mentioned above. The openings (7), in any form, may be recessed into the protection covers (2,3) or raised above the surface of the protection covers, as well as being flush with the covers.

Support saliences, or support pods (5) preferably comprise four small protruding pieces of material distributed evenly among the four corners of the bottom surface of the welding machine. The pods (5) may be constructed of rubber, plastic, metal, or other material suitable for supporting the welding machine. The pods (5) may have any of a variety of cross-sections, including, among others, spherical, square, or rectangular cross-sections.

The electrode support (10) preferably consists primarily of an elongated rectangular body with an electrode protruding from the end further away from the conductor (8). The body of the electrode support (10) may alternatively be shaped in the manner of another elongated solid, such as, among others, a cylinder, pentagonal solid, or hexagonal solid. The length of the electrode support may be between 8 and 24 inches.

The connecting hook or clamp (11) preferably comprises two symmetrically disposed jaw arms which are pivotally spring-supported at a pivot point. The arms preferably diverge outwardly from the pivot point, converge, and cross over at a midpoint. Beyond the midpoint, the arms preferably diverge and converge again, and the ends of the arms then meet and touch each other. From the pivot point to the midpoint, the arms preferably form the shape of a hexagon, while from the midpoint to the ends of the arms, each arm is preferably curved. Alternatively, the arms may form the shape of a hexagon from the midpoint to the ends of the arms. The clamp (11) may be opened by sqeezing the two arms towards each other at a point between the pivot point and the midpoint. The length of the clamp (11), from the point where the clamp is connected to the conductor (9) to the ends of the arms, may be between 5 and 15 inches.

Additionally, in accordance with the accompanying illustrations and their details, the invention consists of applying to the central leg (15) of the core the bundle of steel blades in the shape of the letters "E" (16) and "I" (17), two coils (18) and (19), the former being the primary and the latter the secondary, both placed in the opposite ends of the mentioned central leg being anticipated by a physical separator or block (20) between both coils.

With a construction such as this, we attain the main characteristic, permitting the source of energy, in the case the transformer, to operate as a perfect welding machine, that is, with the characteristics of a source of constant current.

To clarify, it is known that all the cores formed by a bundle of steel blades in the shape of the letters "E" and "I", when in their central leg it is placed a coil fed by alternate current, an electro-magnetic field is formed which changes directions at each cycle. In other words, in any core substantially formed by a plurality of steel blades in the shape of the letters "E" and "I", in which a coil fed by alternating current is placed in the central leg of the core, an electro-magnetic field may be formed which may change directions at each cycle. If the current in the coil is increased, the magnetic field in the blade core is automatically increased.

If this increase is too large, the core is magnetically saturated and the magnetic particles start to flow in a disorderly manner.

With the present invention, by placing a primary coil (18) at one of the ends of the central leg (15) of the core and a second coil, or secondary (19) at the other end, separated by a median block (20), what happens is that, when the electric current flows through the primary, a magnetic field is formed which circulates through the bundle of blades of the core. If the tension (or voltage) applied to this coil is constant, the current which flows in the core and the magnetic field created in the core will also both be constant. The median block, or separator block (20) preferably consists of a dielectric material, such as plastic. The thickness of the block may be between ½" and 1½".

When a charge resistance (21) is placed in the secondary coil, for illustration purposes, a circulating current will appear in this coil whose direction will be opposed to that of the current of flux of the primary current (contra-electromotive force) and it will cause the direction of the magnetic field to be altered.

Figure 9:
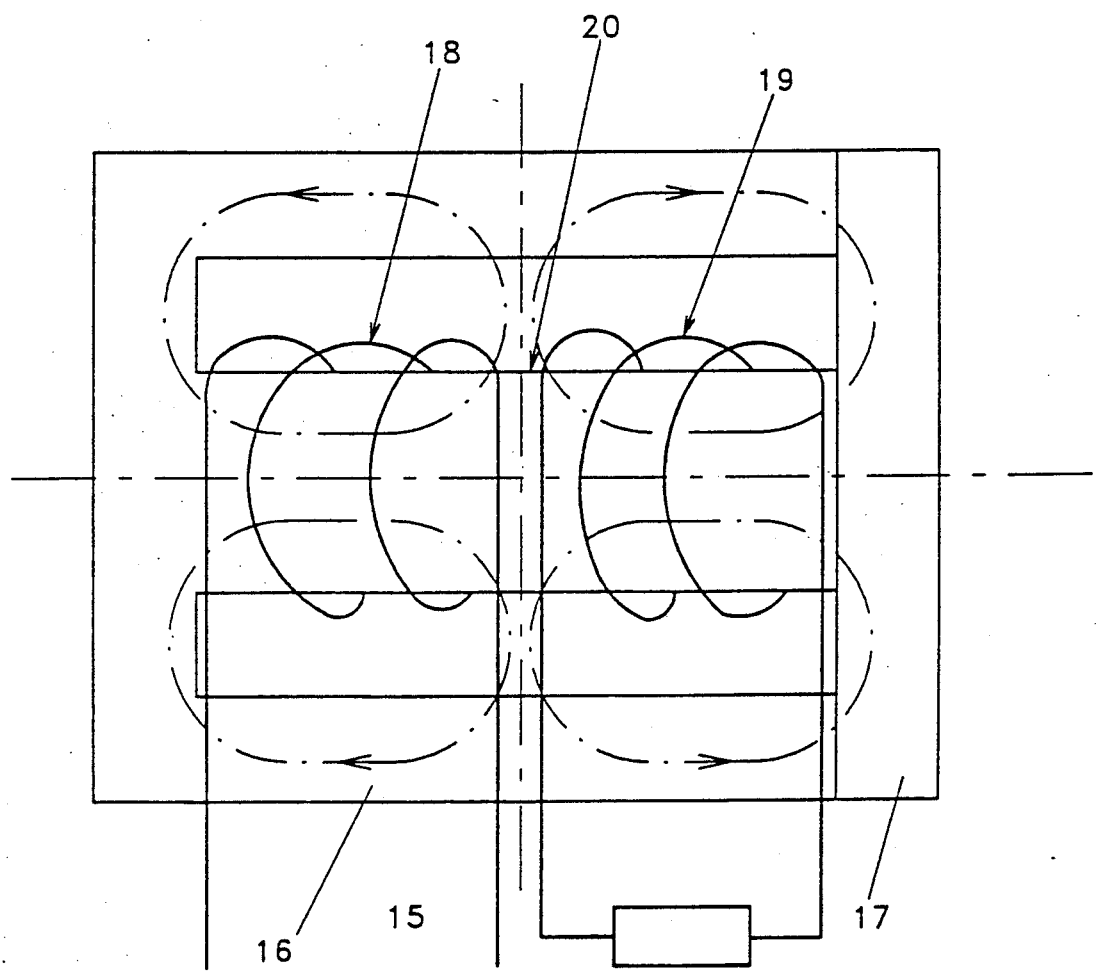
FIG. 9 shows a view of the magnetic flow of the new assemblage.

In this manner, the two coils generate opposite forces, deflecting the magnetic lines from their conductor, which is the central leg of the core, throwing them to the lateral legs, through the space between the two coils, forming a truly magnetic "shunt" but on open air. Therefore, the gap between the two coils is preferably small enough to provide a magnetic reluctance low enough to allow at least some of the magnetic flux through the central leg (15) to move outward from the leg, as shown in FIG. 9. The width of this gap may be between ½" and 1½".

The stronger the circulating current in the secondary coil, the stronger the opposition to the magnetic flux will be, and therefore, the larger the deflection caused by the lines of force circulating in the core will be.

If the current in the secondary circuit increases too much, there will be a point when it will remain stationary, because the flux of magnetic current generated by the primary coil will not have enough strength to move through the central leg of the core, from one end to the other, due to the existing blockage caused by the high current circulating in the secondary coil; for this reason it is determined a drainage of the lines of force throughout the existing space between the two coils, provoking the stabilization of the secondary coil, which no longer has the possibility of having its current increased.

As a result, when we increase the charge resistance (resistance created by the electrode, when welding) there is a tendency for the secondary circuit tension to drop until a point of equilibrium is reached, at which point the current can no longer be increased.

Thus, the transformer starts to operate with the characteristics of constant current, permitting its utilization as a miniaturized welding machine.

Figure 7:
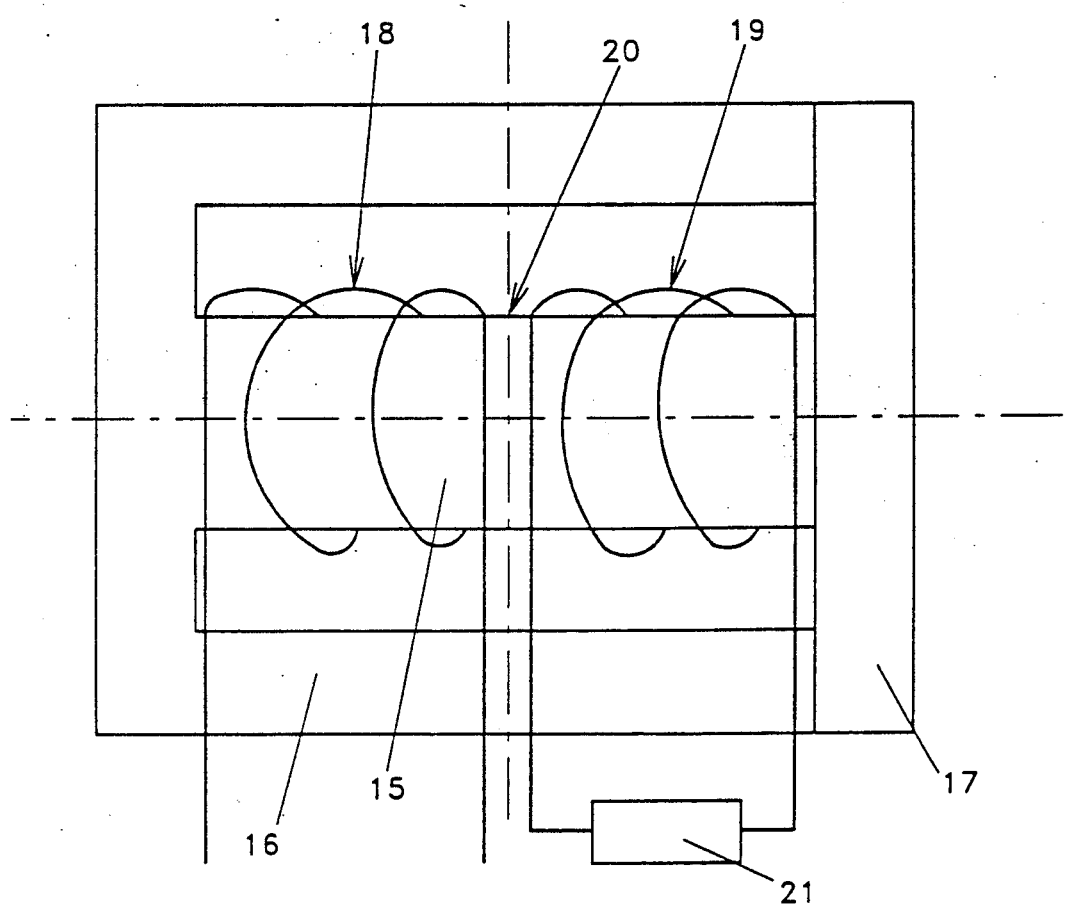
FIG. 7 shows, in diagram, the assembly of the core and coils.
Figure 8:
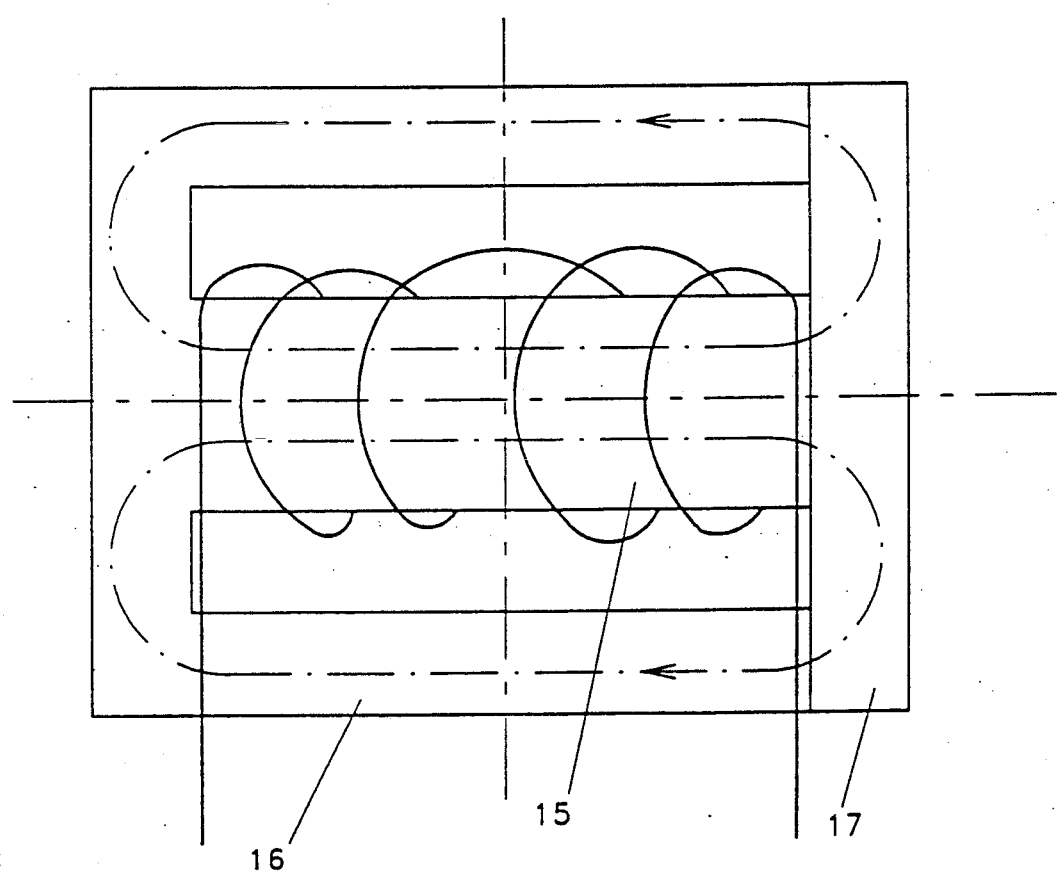
FIG. 8 is a schematic view of the magnetic flow of a known core.

For the utilization, we have to cancel, in FIG. 7, the charge resistance (21), where the welding cables are to be connected.

Figure 10:
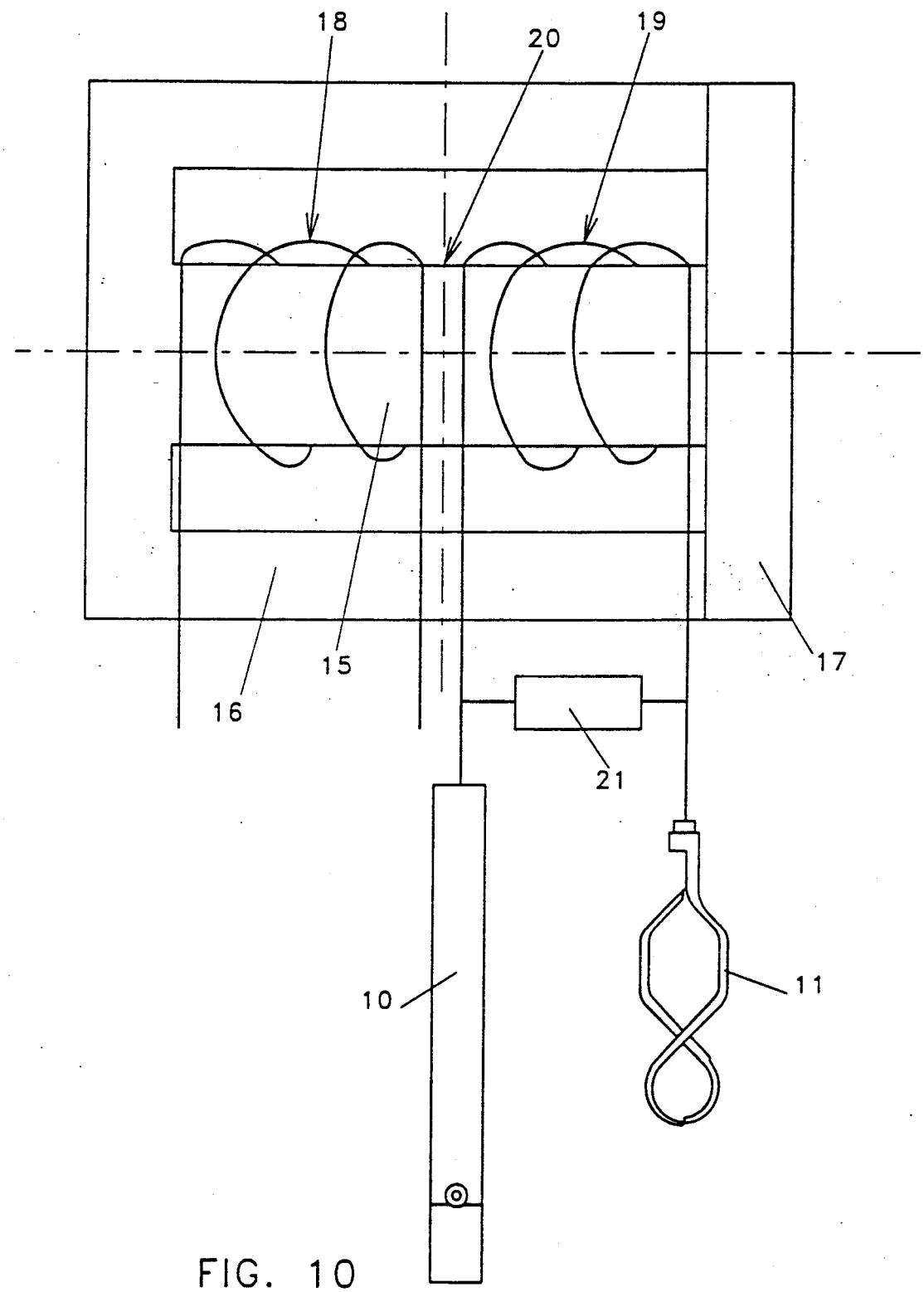
FIG. 10 is substantially the same view as FIG. 7, but further depicting an electrode support and a connecting hook.

FIG. 10 shows the assembly of FIG. 7 in conjunction with the electrode support (10) and connecting hook (11). The electrode support (10) and connecting hook (11) are preferably connected to the ends of the two leads supplying the primary coil (18).

In summary, one feature of the invention resides broadly in a "MINIATURIZED WELDING MACHINE", characterized by the fact of attaching to the central leg 15 of the core a bundle of steel blades shaped as the letters E 16 and "I" 17, two coils 18 and 19, primary the first and secondary the second, both placed on opposite ends of the mentioned central leg, being anticipated a physical separator or block 20 placed between both coils Examples of dielectric material, which may be used for the physical separator (20) of the present invention, may be found in U.S. Pat. Nos. 4,859,977; 4,804,340; 4,552,990; 4,542,362; 4,536,734; and 4,500,832.

Examples of transformers, which may be used with the embodiments of the present invention, may be found in U.S. Pat. Nos. 4,931,761; 4,922,405; 4,896,839; 4,893,105; 4,847,583; and 4,814,733.

Examples of conductors or wires, which may be used with the embodiments of the present invention, may be found in U.S. Pat. Nos. 4,959,266; 4,955,822; 4,946,402; and 4,945,191.

Examples of connecting hooks or clamps, which may be used with the embodiments of the present invention, may be found in U.S. Pat. Nos. 4,820,901; 4,778,413; and 4,725,049.

Examples of electrode supports, which may be used with the embodiments of the present invention, may be found in U.S. Pat. Nos. 4,940,875; 4,644,131; and 4,500,768.

An example of feet or pods for a case or container, which may be used with the embodiments of the present invention, may be found in U.S. Pat. No. 4,628,705.

Finally, an example of handles for a case or container, which may be used with the embodiments of the present invention, may be found in U.S. Pat. No. 4,773,535.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A miniature welding apparatus comprising:
   an external housing;
   a core being disposed within said external housing, said core being for producing welding current;
   an electrode support in electrical communication with said core;
   clamp means in electrical communication with said core;
   first conducting means for providing electric current to said core;
   second conducting means for transmitting electric current between said core and said electrode support;
   third conducting means for transmitting electric current between said core and said clamp means;
   said core comprising a plurality of stacked blades defining a generally rectangular cross-sectional shape divided by a central leg portion;
   said core comprising a pair of outer leg portions defining two sides of the generally rectangular cross-sectional shape, said pair of outer leg portions being parallel to said central leg portion;
   said central leg portion and said pair of outer leg portions being for transmitting magnetic flux;
   said central leg portion and a first of said pair of outer leg portions defining a gap therebetween;
   said central leg portion and a second of said pair of outer leg portions defining another gap therebetween;
   said plurality of stacked blades comprising electrically conductive material;
   a first coil and a second coil being disposed about said central leg portion of said core;
   at least one of said first and said second coils being for transmitting electric current between said first conductor means and said core;
   at least one of said first and said second coils being for transmitting electric current between said core and at least one of said second conductor means and said third conductor means;
   a separator block being disposed between said first and said second coils, said separator block being for forcing a substantial quantity of magnetic flux away from said central leg portion of said core, through each of said gaps, towards said outer leg portions of said core;
   said external housing comprising at least an upper protection cover and a lower protection cover for protecting said core, each of said upper and lower protection covers having a plurality of generally vertical faces;
   the welding apparatus having a vertical dimension of between about 9 inches and about 27 inches;
   said separator block comprising a dielectric material;
   said separator block having a thickness of between about ½ inch and about 1½ inches;
   said external housing having a first horizontal dimension of between about 4 inches and about 12 inches;
   said external housing having a second horizontal dimension of between about 5 inches and about 15 inches, the second horizontal dimension being generally transverse to the first horizontal dimension;
   said lower protection cover having a bottom surface thereof, said bottom surface being generally horizontal;
   pod means disposed on said bottom surface of said lower protection cover for supporting the welding apparatus;
   said upper protection cover having a top surface, said top surface being generally horizontal;
   handle means disposed on the top surface of said upper protection cover for allowing portability of said welding apparatus;
   a plurality of openings being disposed in each said face of each of said upper and lower protection covers of said external housing for providing ventilation;
   each of said openings having a generally semicircular shape;
   each of said openings having a diameter of between about ½ inch and about 1½ inches;
   said openings being configured in an array on each of said faces of each of said upper and lower protection covers, each said array comprising a plurality of generally horizontal rows;
   each said array of each said face of each of said upper and lower protection covers being generally similar to an array of an opposing face;
   said first conducting means entering said external housing through a first face of said upper protection cover, said first face having said first horizontal dimension; and
   said second conducting means and said third conducting means entering said external housing through a second face of said upper protection cover, said second face being opposite said first face and having said first horizontal dimension.

2. The apparatus of claim 1, further comprising a third face and a fourth face of said upper protection cover having said second horizontal dimension, said third face and said fourth face being disposed opposite each other.

3. The apparatus of claim 2, wherein a first face and a second face of said lower protection cover each have said first horizontal dimension and are disposed opposite each other.

4. The apparatus of claim 3, wherein a third face and a fourth face of said lower protection cover each have said second horizontal dimension and are disposed opposite each other.

5. The apparatus of claim 4, wherein each of said first and said second faces of each of said upper and lower protection covers of said external housing has between about 12 and about 20 of said openings.

6. The apparatus of claim 5, wherein each of said third and said fourth faces of each of said upper and lower protection covers of said external housing has between about 18 and about 26 of said openings.

7. The apparatus of claim 6, wherein each said opening in said upper protection cover is oriented such that a convex portion of the semicircular shape is oriented generally upwards.

8. The apparatus of claim 7, wherein each opening in said lower protection cover is oriented such that a convex portion of the semicircular shape is oriented generally downwards.

9. The apparatus of claim 8, wherein each said array of openings comprises two generally horizontal rows of openings, each of said two rows having an equal number of openings.

10. The apparatus of claim 9, wherein each of said upper and lower protection covers has generally rounded corners.

11. The apparatus of claim 10, wherein said upper and lower protection covers comprise a sheet metal material.

12. The apparatus of claim 11, wherein at least some of said openings are recessed into said external housing.

13. The apparatus of claim 12, wherein at least some of said openings are raised from said external housing.

14. The apparatus of claim 13, wherein said pod means comprise four pods, each of said four pods having a generally spherical surface.

15. The apparatus of claim 14, wherein said electrode support generally has a shape of a rectangular solid.

16. The apparatus of claim 15, wherein said pods comprise a rubber material.

17. The apparatus of claim 16, wherein each of said first and second faces of each of said upper and lower protection covers of said external housing has 16 of said openings.

18. The apparatus of claim 17, wherein each of said third and fourth faces of each of said upper and lower protection covers of said external housing has 22 of said openings.

19. The apparatus of claim 18, wherein said electrode support has a length of between about 8 inches and about 24 inches.

20. The apparatus of claim 19, wherein said clamp means has a length of between about 5 inches and about 15 inches.

* * * * *